United States Patent
Gutiérrez et al.

(10) Patent No.: US 7,614,818 B2
(45) Date of Patent: Nov. 10, 2009

(54) SHAFT/HUB CONNECTION WITH SECURING SYSTEM

(75) Inventors: Iñaki Gutiérrez, San Sebastián (ES); Marta Díez, San Sebastián (ES); Enrique Mandado, Vigo (ES); Grégory Lucas, Filderstadt (DE)

(73) Assignee: GKN Driveline International GmbH, Lohmar (DE)

( * ) Notice: Subject to any disclaimer, the term of this patent is extended or adjusted under 35 U.S.C. 154(b) by 0 days.

(21) Appl. No.: 11/322,102

(22) Filed: Dec. 29, 2005

(65) Prior Publication Data

US 2006/0188328 A1     Aug. 24, 2006

Related U.S. Application Data

(63) Continuation of application No. PCT/EP2005/000005, filed on Jan. 3, 2005.

(51) Int. Cl.
*F16C 3/00* (2006.01)
(52) U.S. Cl. .......... 403/359.5; 403/319; 403/332; 403/372; 403/359.6; 464/182
(58) Field of Classification Search .......... 403/1, 403/16, 320, 359.5, 359.1, DIG. 7, 203, 319, 403/332, 372, 375, 359.6; 464/182, 905, 464/906
See application file for complete search history.

(56) References Cited

U.S. PATENT DOCUMENTS

| | | | | |
|---|---|---|---|---|
| 4,077,232 A | | 3/1978 | Grosseau | |
| 4,365,696 A | * | 12/1982 | Telford | 192/69.43 |
| 5,176,413 A | * | 1/1993 | Westman | 285/321 |
| 5,499,884 A | * | 3/1996 | Kuhnhold et al. | 403/359.5 |
| 5,536,101 A | | 7/1996 | Schwarzler et al. | |
| 5,643,092 A | * | 7/1997 | Girguis | 464/145 |
| 6,390,925 B1 | * | 5/2002 | Perrow | 403/359.1 |

FOREIGN PATENT DOCUMENTS

| | | |
|---|---|---|
| DE | 40 40 337 | 6/1992 |
| GB | 855 282 | 11/1960 |

\* cited by examiner

*Primary Examiner*—Michael P Ferguson
(74) *Attorney, Agent, or Firm*—Rader, Fishman & Grauer, PLLC

(57) ABSTRACT

An assembly having a shaft (11) with external splining (23) of a limited length at a shaft end (27), and a hub (41) with a corresponding internal splining (43) that extends essentially the length of the hub. A first axial securing mechanism functions between the shaft and hub, prevents the hub from sliding further onto the shaft, and includes a stop surface (44, 46) on the hub and a counterpart surface (28, 59) on the shaft. A second axial securing mechanism functions between the shaft and hub, prevents the hub from being pulled off from the shaft, and includes a securing ring (51) that is situated at the end of the shaft and the end of the hub oriented toward the shaft end and that engages in radial recesses (48, 54) in the shaft and hub. The recesses form contact surfaces for the securing ring on the shaft and hub.

15 Claims, 3 Drawing Sheets

SHAFT/HUB CONNECTION WITH SECURING SYSTEM

CROSS REFERENCE TO RELATED APPLICATION

This is a continuation of and claims the benefit of PCT/EP2005/000005 filed Jan. 3, 2005 titled "Shaft/Hub Connection With Securing System".

TECHNICAL FIELD

The invention relates to a shaft and hub connection with a securing system having a ring-in-groove configuration.

BACKGROUND

The invention relates to an arrangement having a shaft with an external splining of a limited length that is embodied at a shaft end, and a hub with an internal splining that extends essentially the length of the hub—the external splining and the internal splining engaging each other to permit a transmission of torque between the shaft and hub. A first axial securing means functions between the shaft and hub, preventing the hub from sliding further onto the shaft, and comprises a stop surface on the hub and a counterpart surface on the shaft or a part connected to it at the end of the hub oriented toward the main body of the shaft. A second axial securing means functions between the shaft and hub, preventing the hub from being pulled off from the shaft. It includes a securing ring that is situated at the end of the shaft and the end of the hub oriented toward the shaft end and that engages in radial recesses in the shaft and hub. The recesses constitute the contact surfaces for this securing ring on the shaft and hub. The invention also relates to a method for manufacturing a shaft for such a connection. Such connections are advantageous in constant velocity joint applications.

Known securing systems between a shaft and a hub with a ball track of a constant velocity joint are embodied such that a securing ring guided in a groove is provided between the shaft and hub and prevents the hub from coming off from the shaft in the axial direction. In this connection, there have up to now been two different structural embodiments of the groove in the hub. The first embodiment concerns a detachable shaft/hub connection and the second embodiment concerns a non-detachable shaft/hub connection. In this context, there is only one structural embodiment for a shaft with external splining, with one structural embodiment of an annular groove; the annular groove has two steep flanks of approximately 0°.

In the detachable embodiment of the shaft/hub connection, the securing ring prevents the hub on the shaft from coming off in the axial direction during operation of the constant velocity joint, whereas for repair or maintenance purposes, the structural embodiment is selected so that the hub can essentially be detached from the shaft. In the detachable variant, the securing groove in the hub has a flank closer to the shaft end with an angle of greater than or equal to 15°. The securing groove of the hub exerts the compressive forces on the securing ring so that the securing ring is compressed and the hub can be detached.

In the non-detachable embodiment of the shaft/hub connection, the securing ring prevents the hub on the shaft from coming off in the axial direction during operation of the constant velocity joint. The structural design is selected so that the hub essentially cannot be detached from the shaft. In the non-detachable variant, the securing groove in the hub has a flank closer to the shaft end with an angle of less than or equal to 6°. In this variant, the securing groove in the hub does not exert any compressive forces on the securing ring so that the securing ring is not compressed and the hub cannot be detached.

Consequently, according to the prior art, two different structural embodiments of the hub must be produced in order to achieve a detachable variant and a non-detachable variant. This sharply increases production costs because it requires two different variants to be manufactured and stored. The primary disadvantage lies in the fact that in production and assembly, it is very difficult to differentiate between the two hub variants if they have not been labeled beforehand as to whether they are "detachable" or "non-detachable". It is almost impossible to visually differentiate between the detachable variant and the non-detachable variant because of the extremely small difference in the flank angle of the securing groove. Additionally providing an "identification groove" or another marking that is visible even after assembly incurs additional costs.

An arrangement with axial securing means is known from U.S. Pat. No. 5,536,101. In that case, the first axial securing means is comprised of the external splining end oriented toward the main body of the shaft, the end surface of the hub or the internal splining, and a plastic insert ring whose shape is altered by these splinings. The second axial securing means is comprised of a simple rectangular-section ring that rests against the end of the hub oriented toward the shaft end and lies in a simple rectangular-section groove in the shaft at the protruding shaft end. This second axial securing means can only be used if its spatial placement is freely accessible for assembly and disassembly purposes. This is not the case, for example, if it is necessary to join a shaft to a ball hub of a preassembled swivel joint that is closed on one side. This requires a self-locking securing ring that is preinstalled into the annular groove in the shaft.

JP 5-22089 B2 discloses an arrangement including a hub body and a shaft in which the hub body is embodied in the form of a bevel gear of a differential. In this case, the first axial securing means between the hub body and the shaft is completely eliminated since the hub body is supported axially against a housing in which the shaft is supported. The external splining provided extends all the way to the end of the shaft. Spaced a bit apart from the shaft end, an annular groove with an inclined flank is cut into the splined region. This makes it possible for the shaft, which has a securing ring inserted into the annular groove, to be inserted into the hub body. This elastically forces the securing ring with a round cross section into the annular groove and after the hub is slid on, the securing ring rests against an inclined flank of the hub in an elastically expanding manner so that the annular groove does not have to be accessible after the hub is slid into place. Since the annular groove is cut into the region of the hardened external splining, though, when the internal splining of the hub is slid into place, particularly in the case of a press-fitting, shavings can be pulled against the spline edges, which give rise to unpredictable and inconsistent assembly forces.

U.S. Pat. No. 4,077,232 discloses a connection between an internally splined sleeve and an annular disk element, the latter serving to axially clamp spring-elastic ring elements whose external splining engages with the internal splining of the sleeve. The disk body here also has external splining that engages in the internal splining of the sleeve and is axially secured by a securing ring that is held in recesses in the sleeve and disk element. The disk element has a journal projection that has a smaller outer diameter than the tip diameter of the internal splining of the sleeve and the root circle diameter of the short external splining of the disk element. Torque transmission between the sleeve and the disk element does not occur.

GB 855,282 discloses an arrangement of a hub and a shaft in which a securing ring with a round cross section engages in recesses in the hub and shaft, which are embodied close to the end of the hub oriented toward the main body of the shaft. In this case, an annular groove is cut into the full-depth external splining on the shaft while an annular groove is cut into the internal splining inside the hub, but the tooth height of this internal splining decreases significantly from the annular groove to the end of the hub oriented toward the main body of the shaft. The securing means thus described performs the axial securing in both axial directions.

DE 78 09 284 U1 discloses an arrangement comprising a hub and a shaft with an external splining and a hub with an internal splining in which at the end of the shaft, a transition cone is provided from the tip diameter of the external splining to a journal with a smaller diameter, the journal being embodied in the form of a screw journal. Inside the hub, spaced a bit apart from its end oriented toward the shaft end, the internal splining ends and an annular groove is cut into the hub. From the annular groove to the end of the hub oriented toward the shaft end, the inner diameter corresponds approximately to the root circle diameter of the internal splining. A nut is screwed onto the screw journal and rests against the nub. A securing ring with a circular cross section is situated between the transition cone on the shaft and a counterpart cone in the nut and lies in the annular groove in the hub.

DE 40 40 337 A1 discloses an axial securing means between a hub and a shaft, but does not provide any torque transmitting means, i.e. it does not provide any splining. A securing ring lies in recesses in the hub and in an annular groove close to the end of the shaft. The diameter of the shaft decreases between the annular groove in the shaft and the end of the shaft.

SUMMARY OF THE INVENTION

The present invention provides that the recesses in the hub and shaft are embodied in such a way that the recess in the shaft can accommodate an axial securing mechanism that is easy and inexpensive to manufacture and assures a non-detachable connection between the shaft and hub while providing easy identification and essentially maintaining the strength of the shaft.

In one embodiment, the radial recess in the shaft forms a first stop surface for the securing ring, where the radial recess is embodied in the form of an annular groove with an annular groove diameter (d1) and is adjoined in the direction toward the shaft end by an annular groove step with an annular groove step diameter (d2) and where d2 is greater than d1. The end of the hub oriented toward the shaft end contains an expanding turned groove, which forms a second stop surface for the securing ring. The securing ring is embodied in the form of a round snap ring.

The placement of recesses in the shaft and hub in the immediate vicinity of the shaft end makes it possible to provide a shaft profile of unreduced strength in the entire splined region and in the entire region of the shaft.

The embodiment of the annular groove and the annular groove step according to the invention assures that the hub cannot be nondestructively detached from the shaft since when axial tensile forces are exerted between the hub and shaft that would pull the hub off from the shaft, the contact surfaces on the hub do not push the snap ring back into the annular groove, but instead push it against the edge between the annular groove step and the flank toward the end of the shaft. An axial load exerted between the hub and shaft that would pull the hub off from the shaft can crush the securing ring so that it becomes completely wedged, thus possibly causing damage to the internal splining in the hub if a forced removal is attempted.

In an advantageous embodiment of the invention, the annular groove step diameter (d2) is smaller than the root diameter of the external splining on the shaft.

In a likewise advantageous embodiment of the invention, the gap width of the annular groove is greater than or equal to the diameter of the ring cross section of the securing ring, and the gap width of the annular groove step is less than or equal to the diameter of the ring cross section of the securing ring.

In an additional advantageous embodiment of the invention, the gap width of the annular groove is greater than the gap width of the annular groove step.

In an additional advantageous embodiment of the invention, the gap width of the annular groove is approximately twice as great as the gap width of the annular groove step.

In a likewise advantageous embodiment of the invention, the annular groove has a flank that is perpendicular to the shaft axis and closer to the main body of the shaft and has a perpendicular flank closer to the end of the shaft, and the annular groove step has a perpendicular flank closer to the end of the shaft.

In a particularly advantageous embodiment of the invention, the diameter of the ring cross section of the securing ring is greater than the distance between the groove bottom of the annular groove step and the circumference surface of the recess.

In addition, the first axial securing mechanism includes a spline end of the external splining and a corresponding spline bevel at the end of the internal splining in the hub oriented toward the main body of the shaft. This represents a structurally favorable embodiment. However, other possible embodiments are also contemplated, including those according to known configurations.

In a detachable connection of the hub and shaft, the hub has an inclined contact surface and only one annular groove is provided, which has two flanks perpendicular to the shaft axis so that when axial tensile forces are exerted between the hub and shaft that would pull the hub from the shaft, the contact surface on the hub pushes the snap ring back into the annular groove and the hub can be slid off over it.

Other advantages of the invention will become apparent upon reading the following detailed description and appended claims, and upon reference to the accompanying drawings.

BRIEF DESCRIPTION OF THE DRAWINGS

For a more complete understanding of this invention reference should be made to the embodiments illustrated in greater detail in the accompanying drawings and described below by way of examples of the invention, wherein.

DETAILED DESCRIPTION

While the present invention is described with respect to a method and apparatus for securing a hub and shaft in the context of a constant velocity joint application or wheel hub application, the present invention may be adapted and utilized for other shaft and hub connection applications. Further, in the following description, various operating parameters and components are described for one constructed embodiment. These specific parameters and components are included as examples and are not meant to be limiting.

Additionally, in the following detailed description, spatially orienting terms are used such as "left," "right," "vertical," "horizontal," and the like. It is to be understood that these terms are used for convenience of description of the features or embodiments by reference to the drawings. These terms do not necessarily describe the absolute location in space, such as left, right, upward, downward, etc., that any part must assume.

Figure 1:
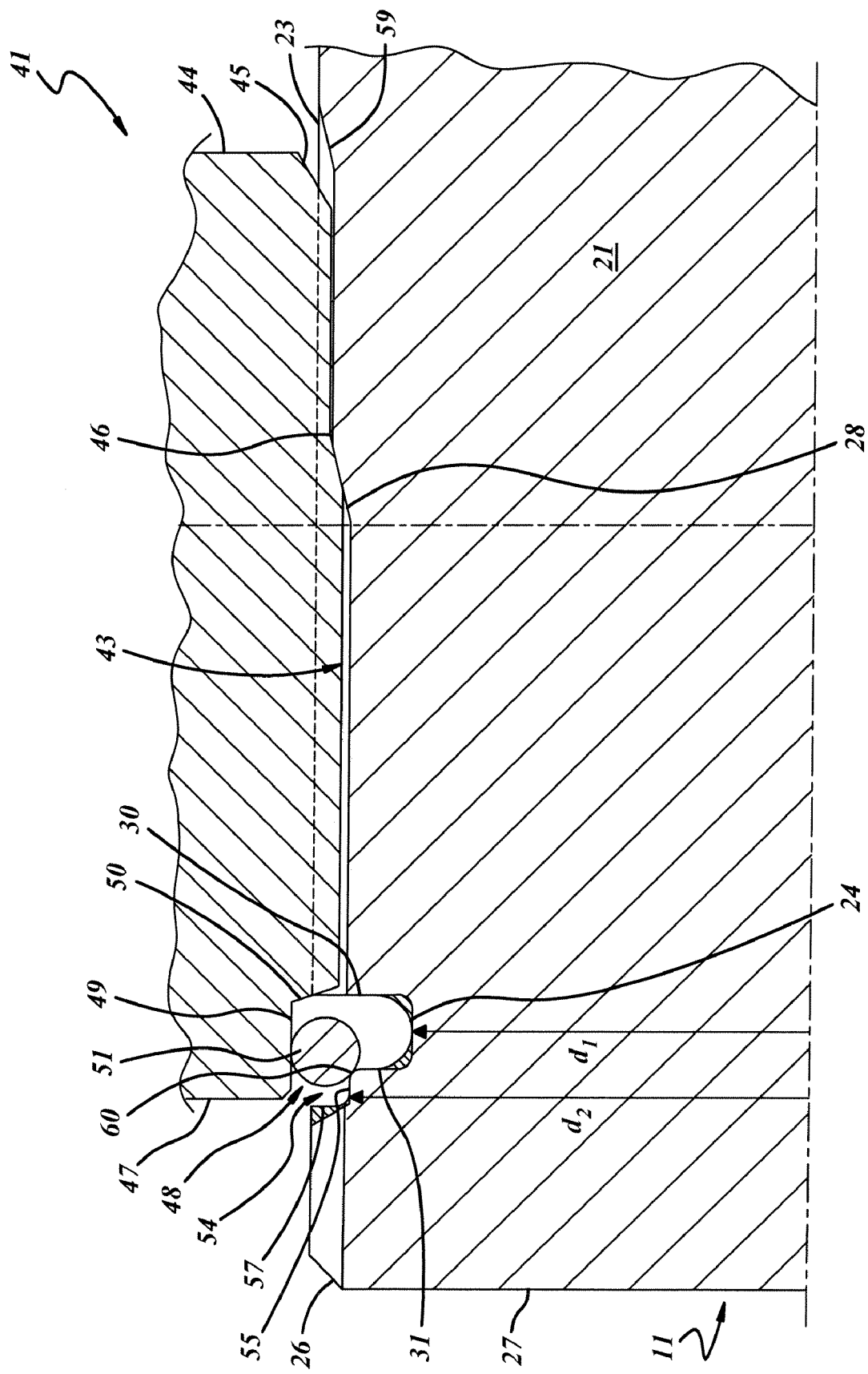
FIG. 1 shows a shaft, securing ring, and hub in a non-detachable arrangement according to an embodiment of the present invention.
Figure 2:
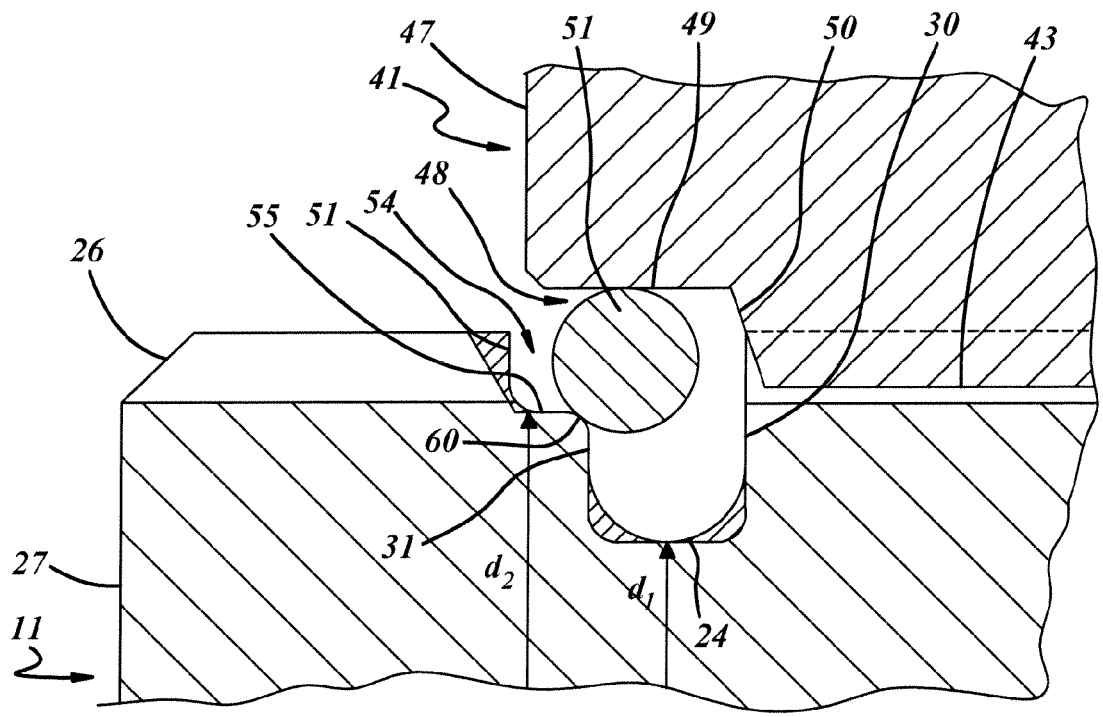
FIG. 2 shows an enlarged detail of a shaft, securing ring, and hub arrangement according to FIG. 1.

Referring now to the drawings wherein like reference numerals are used to identify identical components in the various views, FIG. 1 illustrates a shaft 11, a hub 41, and a securing ring 51 in non-detachable arrangement according to an embodiment of the present invention. FIG. 2 shows an enlarged detail of a shaft, securing ring, and hub arrangement according to FIG. 1. On the shaft 11, from right to left in the broken view of the shaft body 21, an external splining 23, an annular groove 24, and an annular groove step 55 are visible. The shaft 11 with the external splining 23 ends with a bevel 26 at the end surface 27, which can also conceptually be referred to as the shaft end. The external splining 23 ends at a spline end 59 at which the splines come to an end. The annular groove 24 has a steep first radial flank 30 on the side closer to the main body of the shaft (right side), a cross-sectionally rounded groove bottom adapted to the securing ring, and a steep second radial flank 31 (left side) whose height is less than that of the radial flank 30. The annular groove step 55 has a perpendicular third flank 57 even closer to the end of the shaft 11. The first, second and third flanks each have an angle of approximately 0° with respect to vertical.

The hub 41 has a ball track, not shown, which is of no further significance to the connection, and an internal splining 43 that engages the external splining 23 in a form-locked manner in the direction of rotation. The drawing also shows that the hub has an end surface 44 oriented toward the main body of the shaft 11 and an end surface 47 oriented toward the end of the shaft 11, which are conceptually equivalent to the respective ends. Starting from the end surface 44 oriented toward the main body of the shaft 11, the hub 41 contains an internal cone 45 whose opening angle can correspond to the inclination angle of the spline end 59 of the external splining 23. In addition, an internal cone is provided which forms a bevel 46 that has a large inclination angle on the internal splining 43. The bevel 46 cooperates with the spline end 28, and comprises a first stop that prevents the hub 41 from sliding further onto the shaft 11 when the structurally determined end position has been reached. Alternatively, this could also occur, for example, in the region of the internal cone 45, which would cooperate with the inclined end 59 to form a first stop. At the end surface 47 of the hub 41 oriented toward the end of the shaft 11, the hub 41 has an annular recess 48 that forms a cylindrical circumference surface 49 and provides a conical stop surface 50 for the securing ring 51. The conical stop surface has an angle of greater than or equal to 15° with respect to vertical. In this example, the securing ring 51 is in the form of a round snap ring. The diameter of the recess 48 can be less than the root diameter of the internal splining 43, thus permitting the surfaces 49 and 50 to be interrupted by the spline grooves of the internal splining 43.

In FIG. 1, the internal splining 43 of the hub 41 has been slid axially all the way onto the external splining 23 of the shaft 11. The securing ring 51 contained in the annular groove 24 of the shaft 11 presses radially outward under its own inherent stress. When the hub is being slid into place, the internal conical surface 45 and the adjoining internal splining 43 press the securing ring 51 into the bottom of the groove 24. The internal conical surface 45 serves as an insertion bevel and the radial surface of the first flank 30 serves as an opposing or guiding surface. The hub 41 is slid until the bevel 46 of the internal splining 43 comes into contact with the spline end 28 of the external splining 23. The securing ring 51 springs out from the groove bottom and rests with its outside against the inner cylindrical surface 49.

The annular groove 24 has an annular groove diameter (d1) and is adjoined in the direction toward the shaft end by the annular groove step 55 with an annular groove step diameter (d2), wherein d2 is greater than d1.

The embodiment of the annular groove 24 and annular groove step 55 according to the invention assures that the hub 41 cannot be nondestructively detached from the shaft 11 since when axial tensile forces are exerted between the hub 41 and the shaft 11 that would pull the hub 41 off from the shaft 11, the contact surface 50 of the hub 41 does not push the snap ring 51 back into the annular groove 24, but instead forces it against the edge 60 between the annular groove step 55 and the second flank 31 closer to the end of the shaft 11. An axial load exerted between the hub 41 and shaft 11 that would pull the hub 41 off, can crush the securing ring 51 so that it becomes completely wedged, thus possibly also causing damage to the internal splining 43 of the hub 41 if a forced removal is attempted.

In an advantageous embodiment of the invention, the annular groove step diameter (d2) is smaller than the root diameter of the external splining 43 on the shaft 11.

In a likewise advantageous embodiment of the invention, the gap width of the annular groove, i.e., the distance between the first flank 30 and second flank 31, is greater than or equal to the diameter of the ring cross section of the securing ring, and the gap width of the annular groove step, i.e., the axial distance between the second flank 31 and the third flank 57, is less than or equal to the diameter of the ring cross section of the securing ring.

In an additional advantageous embodiment of the invention, the gap width of the annular groove 24 is greater than the gap width of the annular groove step 55. In an additional advantageous embodiment of the invention, the gap width of the annular groove 24 is approximately twice as great as the gap width of the annular groove step 55.

In a particularly advantageous embodiment of the invention, the diameter of the ring cross section of the securing ring 51 is greater than the distance between the groove bottom of the annular groove step 55 and the circumference surface 49 of the recess.

Figure 4:
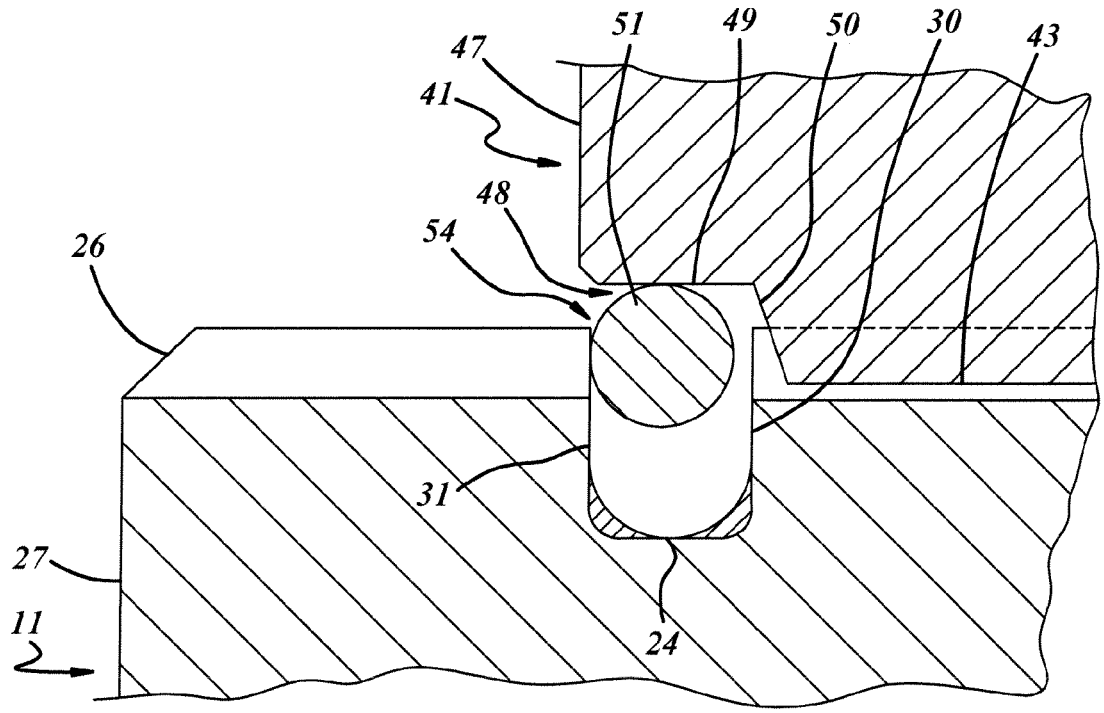
FIG. 4 shows an enlarged detail of a shaft, securing ring, and hub arrangement according to FIG. 3.
Figure 3:
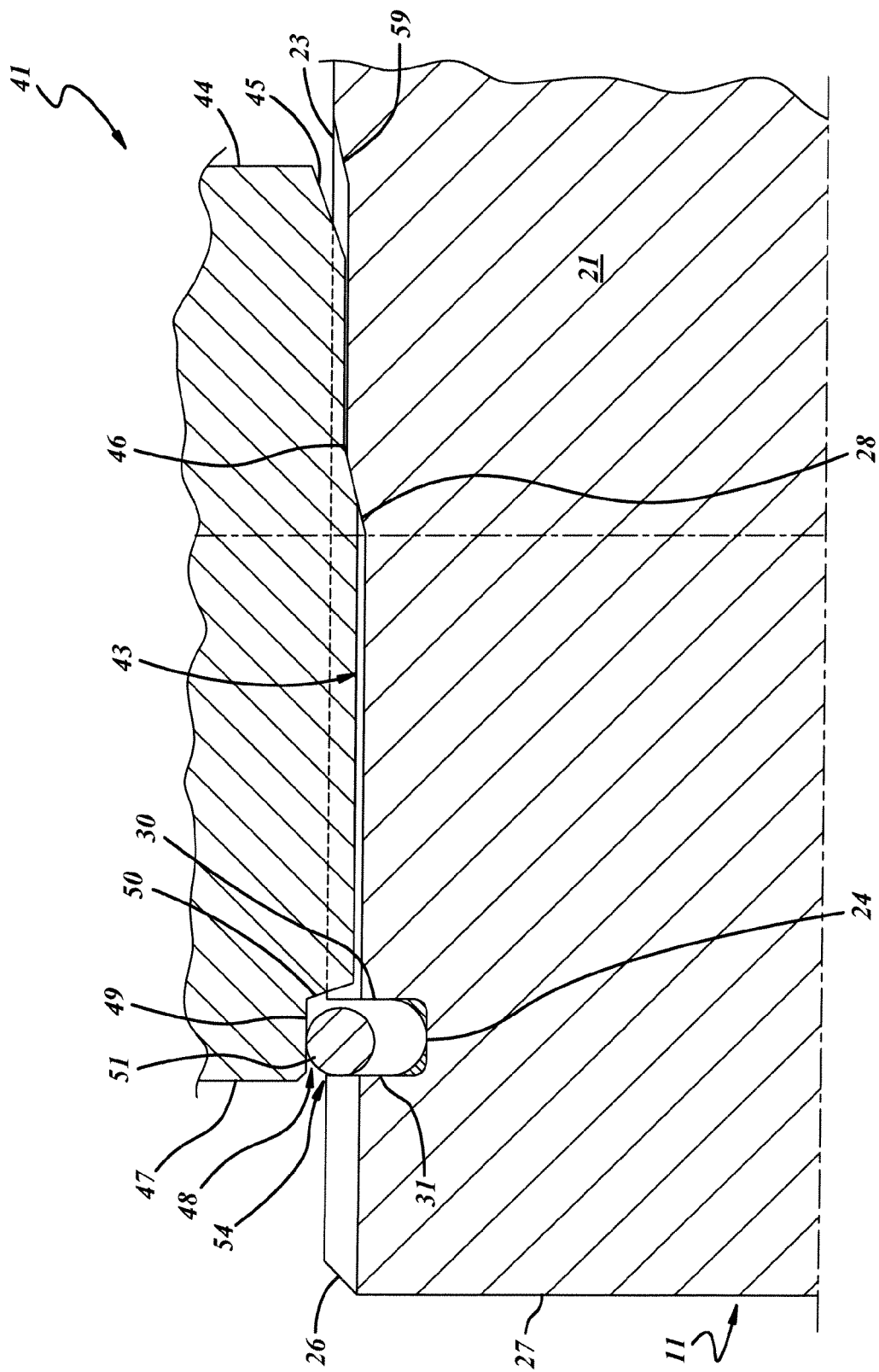
FIG. 3 shows a shaft, securing ring, and hub in a non-detachable arrangement according to an embodiment of the present invention.

FIG. 3 illustrates a shaft 111, a hub 41, and a securing ring 51 in detachable arrangement according to an embodiment of the present invention. FIG. 4 shows an enlarged detail of a shaft, securing ring, and hub arrangement according to FIG. 3. As shown in FIGS. 3 and 4, in the detachable connection of the hub 41 and shaft 111, the hub has an inclined contact surface 50 and only one annular groove 24 is provided in the shaft 111. The annular groove 24 has a first flank 30 and a second flank 31 perpendicular to the shaft axis so that when axial tensile forces are exerted between the hub 41 and shaft 111 that would pull the hub from the shaft, the contact surface 50 on the hub 41 pushes the snap ring 51 back into the annular groove 24 and the hub 41 can be slid off the shaft 111.

The following describes details of the shaft 111, hub 41, and securing ring 51. On the shaft 111, from right to left of the broken view of the shaft body, an external splining 23 and an annular groove 24 are visible. The shaft 111 with the external splining 23 ends with a bevel 26 at the end surface 27, which can also conceptually be referred to as the end of the shaft 111. The external splining 23 ends at a spline end 59 in which the spline grooves come to an end. The annular groove 24 has a first steep radial flank 30 on the side closer to the main body of the shaft, a cross-sectionally rounded groove bottom adapted to the securing ring 51, and a steep second radial flank 31 whose height corresponds to the height of the radial flank 30. The first and second flanks each have an angle of approximately 0° with respect to vertical.

The hub 41 has a ball track, not shown, which is of no further significance to the connection, and an internal splining 43 that engages the external splining 23 in a form-locked manner in the direction of rotation. The drawings also show that the hub has an end surface 44 oriented toward the main body of the shaft and an end surface 47 oriented toward the end of the shaft, which are conceptually equivalent to the respective ends. Starting from the end surface 44 oriented toward the main body of the shaft, the hub 41 has an internal conical surface 45 whose opening angle can correspond to the inclination angle of the spline end 59 of the external splining 23. In addition, an internal cone is provided, which forms a bevel 46 that has a large inclination angle on the internal splining 43, cooperates with the spline end 28, and forms a first stop that prevents the hub from sliding further onto the shaft when the structurally determined end position has been reached. Alternatively, this could also occur, for example, in the region of the internal cone 45, which would cooperate with the inclined end 59 to constitute a first stop. At the end surface 47 of the hub 41 oriented toward the end of the shaft, the hub has a recess 48 forming a cylindrical circumference surface 49 and providing a conical stop surface 50 for the securing ring 51. The conical stop surface 50 has an angle of greater than or equal to 15° with respect to vertical. The diameter of the recess 48 can be less than the root diameter of the internal splining 43 so that the surfaces 49 and 50 can be interrupted by the spline grooves of the internal splining 43.

In FIGS. 3 and 4, the internal splining 43 of the hub 41 has been slid axially all the way onto the external splining 23 of the shaft 111. The securing ring 51 contained in the annular groove 24 here presses radially outward under its own inherent stress. In this example, the securing ring 51 is a round snap ring. When the hub 41 is being slid into place, the internal conical surface 45 and the adjoining internal splining 43 press the securing ring 51 into the bottom of the annular groove 24. The internal conical surface 45 serves as an insertion bevel and the radial surface of the first flank 30 serves as an opposing or guiding surface. The hub 41 is slid until the bevel 46 of the internal splining 43 comes into contact with the spline end 28 of the external splining 23. The securing ring 51 springs out from the groove bottom and rests with its outside against the inner cylindrical surface 49.

The embodiment of the annular groove 24 according to the invention assures that the hub 41 can be nondestructively detached from the shaft 111 since when axial tensile forces are exerted between the hub 41 and the shaft 111 that would pull the hub 41 off from the shaft 111, the contact surface 50 of the hub 41 pushes the snap ring 51 back into the annular groove 24, the second flank 31 serving as an opposing or guiding surface.

In all of the embodiments, the internal splining 43 and the external splining 46 can be hardened by heat treatment processes, while the annular groove 24 and/or the annular groove step 55 are not hardened.

In another aspect of the invention, a method of manufacturing a shaft for an assembly arrangement according to the present invention includes providing a straight, smooth cylindrical shaft. A first annular groove 24 and annular groove step 55 are cut into the shaft 11 in arbitrary sequence. The annular groove 24 and annular groove step 55 are spaced slightly apart from the shaft end 27. Thereafter, external splining is produced such that it does not cause any function-influencing changes to the annular groove 24 or annular groove step 55. The external splining 23 can be produced by a spline die, starting from the annular groove 24 and continuing on to the spline end 28 in the shaft body 21, using an axial pressing process. The external splining 23 can also be rolled into the shaft by beading dies. The annular groove 24 and/or the annular groove step 55 can be manufactured in a single clamping setup of the shaft 11, together with all other lathe work processes performed on the shaft 11. The process step of manufacturing the external splining 23 can also be the final machining step performed on the shaft 11.

From the foregoing, it can be seen that there has been brought to the art a new and improved shaft and hub securing system which has advantages over prior shaft and hub securing systems. While the invention has been described in connection with one or more embodiments, it should be understood that the invention is not limited to those embodiments. On the contrary, the invention covers all alternatives, modifications and equivalents as may be included within the spirit and scope of the appended claims.

The invention claimed is:

1. An assembly, comprising:
   a shaft with an external splining of a limited length located at an end of the shaft;
   a hub with an internal splining extending essentially the length of the hub, the external splining and internal splining engaging each other to permit a transmission of torque between the shaft and hub;
   a first axial securing mechanism between the shaft and hub preventing the hub from axially sliding further onto the shaft, the first axial securing mechanism comprising a stop surface on the hub and a counterpart surface on the shaft; and
   a second axial securing mechanism between the shaft and hub, preventing the hub from being pulled off from the shaft, the second axial securing mechanism comprising a securing ring in the form of a round snap ring situated at the end of the shaft and an end of the hub oriented toward the shaft end and that engages in a radial recess in the shaft and a radial recess in the hub, both recesses forming contact surfaces for the securing ring on the shaft and hub,
   wherein the radial recess in the shaft comprises a first annular groove with an annular groove diameter (d1) adjoining, in the direction toward the shaft end, and an annular groove step with an annular groove step diameter (d2), wherein the annular groove step (d2) is greater than the annular groove diameter (d1), the radial recess in the shaft forming a first stop surface for the securing ring,
   wherein the radial recess in the hub comprises a second annular groove formed in the end of the hub oriented toward the shaft end; and
   wherein the first annular groove has a first flank substantially perpendicular to the shaft axis and closer to the main body of the shaft, and a second flank substantially perpendicular to the shaft axis and closer to the end of the shaft, and the annular groove step has a third flank substantially perpendicular to the shaft axis and closer to the end of the shaft than the second flank.

2. An assembly according to claim 1, wherein the annular groove step diameter (d2) is smaller than a root diameter of the external splining of the shaft.

3. An assembly according to claim 1, wherein a gap width of the first annular groove is greater than or equal to a diameter of the ring cross section of the securing ring.

4. An assembly according to claim 3, wherein a gap width of the annular groove step is less than or equal to a diameter of the ring cross section of the securing ring.

5. An assembly according to claim 3, wherein a gap width of the first annular groove is greater than a gap width of the annular groove step.

6. An assembly according to claim 3, wherein a gap width of the first annular groove is approximately twice as great as a gap width of the annular groove step.

7. An assembly according to claim 3, wherein a diameter of the ring cross section of the securing ring is greater than a distance between a bottom of the annular groove step and a circumferential surface of the second annular groove.

8. An assembly according to claim 1, wherein a gap width of the first annular groove is greater than a gap width of the annular groove step.

9. An assembly according to claim 1, wherein a gap width of the first annular groove is approximately twice as great as a gap width of the annular groove step.

10. An assembly according to claim 1, wherein a diameter of the ring cross section of the securing ring is greater than a distance between a bottom of the annular groove step and a circumferential surface of the second annular groove.

11. An assembly according to claim 1, wherein a diameter of the ring cross section of the securing ring is greater than a distance between a bottom of the annular groove step and a circumferential surface of the second annular groove.

12. An assembly according to claim 1, wherein the first axial securing mechanism comprises a spline end of the external splining and a corresponding spline bevel at an end of the internal splining in the hub oriented toward the main body of the shaft.

13. An assembly according to claim 1, wherein the internal splining and the external splining are hardened by heat treatment processes and the first annular groove or the annular groove step are not hardened.

14. An assembly according to claim 1, wherein the second annular groove defines a conical stop surface angled at least 15 degrees with respect to the shaft axis.

15. An assembly, comprising:
a shaft with an external splining of a limited length located at an end of the shaft;
a hub with an internal splining extending essentially the length of the hub, the external splining and internal splining engaging each other to permit a transmission of torque between the shaft and hub;
a first axial securing mechanism between the shaft and hub preventing the hub from axially sliding further onto the shaft, the first axial securing mechanism comprising a stop surface on the hub and a counterpart surface on the shaft; and
a second axial securing mechanism between the shaft and hub, preventing the hub from being pulled off from the shaft, the second axial securing mechanism comprising a securing ring in the form of a round snap ring situated at the end of the shaft and an end of the hub oriented toward the shaft end and that engages in a radial recess in the shaft and a radial recess in the hub, both recesses forming contact surfaces for the securing ring on the shaft and hub,
wherein the radial recess in the shaft comprises a first annular groove with an annular groove diameter (d1) adjoining, in the direction toward the shaft end, and an annular groove step with an annular groove step diameter (d2), wherein the annular groove step (d2) is greater than the annular groove diameter (d1), the radial recess in the shaft forming a first stop surface for the securing ring,
wherein the radial recess in the hub comprises a second annular groove formed in the end of the hub oriented toward the shaft end;
wherein a gap width of the first annular groove is greater than or equal to a diameter of the ring cross section of the securing ring; and
wherein the first annular groove has a first flank substantially perpendicular to the shaft axis and closer to a main body of the shaft, and a second flank substantially perpendicular to the shaft axis and closer to the end of the shaft, and the annular groove step has a third flank substantially perpendicular to the shaft axis and closer to the end of the shaft than the second flank.

* * * * *